(12) United States Patent
Joung et al.

(10) Patent No.: US 8,993,196 B2
(45) Date of Patent: Mar. 31, 2015

(54) FUEL CELL SYSTEM HAVING FUEL CIRCULATION STRUCTURE, METHOD OF OPERATING THE SAME, AND ELECTRONIC APPARATUS INCLUDING THE FUEL CELL SYSTEM

(75) Inventors: Young-soo Joung, Anseong-si (KR); Hye-jung Cho, Anyang-si (KR); Sang-ho Yoon, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 743 days.

(21) Appl. No.: 12/645,694

(22) Filed: Dec. 23, 2009

(65) Prior Publication Data

US 2010/0098981 A1 Apr. 22, 2010

(30) Foreign Application Priority Data

Dec. 30, 2008 (KR) ........................ 10-2008-0137165

(51) Int. Cl.
*H01M 8/04* (2006.01)
*H01M 8/02* (2006.01)
*H01M 8/10* (2006.01)

(52) U.S. Cl.
CPC ...... *H01M 8/04208* (2013.01); *H01M 8/04097* (2013.01); *H01M 8/04753* (2013.01); *H01M 8/1011* (2013.01); *Y02E 60/50* (2013.01)
USPC .......... 429/515; 429/408; 429/415; 429/416; 429/428; 429/443; 429/446; 429/447; 429/448; 429/455; 429/462; 429/506; 429/512; 429/513

(58) Field of Classification Search
None
See application file for complete search history.

(56) References Cited

U.S. PATENT DOCUMENTS

| 3,843,410 | A | * | 10/1974 | Spahrbier | 429/416 |
| 5,599,638 | A | * | 2/1997 | Surampudi et al. | 429/494 |
| 5,766,786 | A | * | 6/1998 | Fleck et al. | 429/413 |
| 6,506,513 | B1 | * | 1/2003 | Yonetsu et al. | 429/448 |
| 6,610,433 | B1 | * | 8/2003 | Herdeg et al. | 429/443 |
| 6,924,054 | B2 | * | 8/2005 | Prasad et al. | 429/416 |
| 7,276,303 | B2 | * | 10/2007 | Miyamoto et al. | 429/449 |
| 7,291,410 | B2 | * | 11/2007 | Kinkelaar et al. | 429/513 |
| 7,297,426 | B2 | * | 11/2007 | Sakai et al. | 429/410 |
| 7,374,832 | B2 | * | 5/2008 | Miyamoto et al. | 429/447 |

(Continued)

FOREIGN PATENT DOCUMENTS

| CN | 101326664 A | 12/2008 |
| JP | 2003-257466 | 9/2003 |

(Continued)

OTHER PUBLICATIONS

Office Action issued in corresponding European application, 09 180 741.2, dated May 27, 2011.

(Continued)

*Primary Examiner* — Jeffrey Wollschlager
(74) *Attorney, Agent, or Firm* — Lee & Morse, P.C.

(57) ABSTRACT

In a fuel cell system including a fuel cartridge and a fuel supply module, the fuel cartridge includes at least two ports, wherein a first port from among the at least two ports is a fuel inlet port and a second port from among the at least two ports is a fuel outlet port. The fuel cartridge may also include a fuel pouch or the fuel cartridge itself may be the fuel pouch. The fuel supply module may include a fuel circulation structure that circulates the fuel before the fuel is supplied to the stack. The fuel cell system may be equipped with an electronic apparatus and serve as a source of power.

32 Claims, 11 Drawing Sheets

(56) References Cited

U.S. PATENT DOCUMENTS

| | | | |
|---|---|---|---|
| 7,531,013 B2* | 5/2009 | Ren et al. | 44/266 |
| 7,595,123 B2* | 9/2009 | Sone et al. | 429/428 |
| 7,779,856 B2* | 8/2010 | Adams et al. | 137/210 |
| 7,927,760 B2* | 4/2011 | Wang et al. | 429/512 |
| 7,977,001 B2* | 7/2011 | Norimatsu et al. | 429/448 |
| 8,076,043 B2* | 12/2011 | Hasegawa et al. | 429/512 |
| 8,235,077 B2* | 8/2012 | Curello et al. | 141/347 |
| 2003/0121481 A1 | 7/2003 | Dodd et al. | |
| 2003/0124408 A1* | 7/2003 | Hojo et al. | 429/34 |
| 2003/0138679 A1* | 7/2003 | Prased et al. | 429/19 |
| 2004/0009381 A1 | 1/2004 | Sakai et al. | |
| 2004/0023081 A1* | 2/2004 | Ushiro et al. | 429/9 |
| 2004/0072049 A1* | 4/2004 | Becerra et al. | 429/34 |
| 2004/0146769 A1* | 7/2004 | Birschbach | 429/34 |
| 2005/0023236 A1* | 2/2005 | Adams et al. | 215/3 |
| 2005/0064264 A1* | 3/2005 | Ito et al. | 429/34 |
| 2005/0074643 A1* | 4/2005 | Adams et al. | 429/19 |
| 2005/0121374 A1 | 6/2005 | Girondi | |
| 2005/0147856 A1* | 7/2005 | Albrodt et al. | 429/17 |
| 2005/0244241 A1 | 11/2005 | Miyazaki et al. | |
| 2006/0006108 A1* | 1/2006 | Arias et al. | 210/232 |
| 2006/0204802 A1* | 9/2006 | Specht | 429/22 |
| 2007/0020497 A1* | 1/2007 | Ryoichi et al. | 429/32 |
| 2007/0077463 A1* | 4/2007 | Adams et al. | 429/13 |
| 2007/0077470 A1 | 4/2007 | Adams et al. | |
| 2007/0166586 A1* | 7/2007 | Marchand et al. | 429/25 |
| 2007/0172714 A1* | 7/2007 | Tsuchino et al. | 429/34 |
| 2008/0070070 A1* | 3/2008 | Sakai et al. | 429/12 |
| 2008/0107924 A1 | 5/2008 | Wang et al. | |
| 2009/0169967 A1* | 7/2009 | Wang et al. | 429/34 |
| 2010/0196769 A1* | 8/2010 | Na et al. | 429/415 |

FOREIGN PATENT DOCUMENTS

| | | |
|---|---|---|
| JP | 2005-093116 | 4/2005 |
| JP | 2005-517117 | 6/2005 |
| JP | 2008-117745 A | 5/2008 |
| WO | WO-03/067068 A1 | 8/2003 |

OTHER PUBLICATIONS

Japanese Office Action issued in corresponding Japanese Patent Application No. 2009-296117, dated Jun. 5, 2012. (Young-soo Joung, et al.)

Chinese Office Action dated Jan. 23, 2014.

Japanese Office Action dated Mar. 26, 2013.

European Examination Report dated Nov. 15, 2013.

Chinese Office Action dated Jul. 1, 2013.

* cited by examiner

FUEL CELL SYSTEM HAVING FUEL CIRCULATION STRUCTURE, METHOD OF OPERATING THE SAME, AND ELECTRONIC APPARATUS INCLUDING THE FUEL CELL SYSTEM

CROSS-REFERENCE TO RELATED APPLICATION

This application claims the benefit of Korean Patent Application No. 10-2008-0137165, filed on Dec. 30, 2008, in the Korean Intellectual Property Office, the disclosure of which is incorporated herein in its entirety by reference.

BACKGROUND

1. Field

One or more embodiments relate to a fuel cell system having a fuel circulation structure, a method of operating the fuel cell system, and an electronic apparatus including the fuel cell system.

2. Description of the Related Art

A small-sized fuel cell system (hereinafter, referred to as a fuel cell system) such as a direct methanol fuel cell (DMFC) may be used as an energy supply source of household or portable electronic products.

FIG. 1 is a block diagram of a general fuel cell system. Referring to FIG. 1, the general fuel cell system includes a stack 10, a feed pump 12, a fuel concentration sensor 14, a mixer 16, a fuel flow sensor 18, a fuel pump 20, a control circuit 22, and a fuel cartridge 26, wherein the stack 10 generates power, the feed pump 12 supplies fuel having an appropriate concentration, the fuel concentration sensor 14 senses the concentration of fuel supplied to the feed pump 12 from the mixer 16, the mixer 16 dilutes high concentration fuel supplied from the fuel cartridge 26, the fuel flow sensor 18 senses the amount of the fuel supplied to the mixer 16, the fuel pump 20 supplies the fuel stored in the fuel cartridge 26 to the mixer 16, the control circuit 22 controls the operation of the fuel pump 20, and the fuel cartridge 26 stores the fuel.

In the general fuel cell system, the amount of fuel supplied to the stack 10 per hour is small. Accordingly, the fuel supplied to the mixer 16 is minutely adjusted. Accordingly, a pump (hereinafter, precision pump) that is capable of precisely supplying a very small amount of fuel is used as the fuel pump 20. However, the precision pump is expensive.

Also, in the general fuel cell system of FIG. 1, according to the movement of the general fuel cell system and/or a remaining amount of the fuel stored in the fuel cartridge 26, the pressure in the fuel cartridge 26 may be different. Accordingly, the amount of the fuel supplied to the fuel pump 20 from the fuel cartridge 26 may be different. As a result, the concentration of the fuel supplied to the stack 10 may not be uniformly controlled. Thus, the fuel flow sensor 18 and the fuel concentration sensor 14 may be inevitably included in the general fuel cell system of FIG. 1 and a fuel supply feedback process needs to be performed. Accordingly, programs for operating and controlling the fuel concentration sensor 14 and the fuel flow sensor 18 and a program for controlling the fuel supply feedback process are needed. Since the fuel pump 20, the fuel flow sensor 18, and fuel concentration sensor 14 are included in the general fuel cell system, the price of the general fuel cell system may increase.

In addition, with regard to an operation initiation, while the fuel moves from the fuel cartridge 26 to the fuel pump 20, self-priming may be delayed. When there is gas in a path between the fuel cartridge 26 and the fuel pump 20, the time taken for self-priming may be longer. In particular, when there is gas in the fuel pump 20, fuel pumping is difficult and thus self-priming may not occur.

SUMMARY

One or more embodiments include a fuel cell system having a fuel circulation structure.

One or more embodiments include a method of operating the fuel cell system.

One or more embodiments include an electronic apparatus including the fuel cell system.

Additional aspects will be set forth in part in the description which follows and, in part, will be apparent from the description, or may be learned by practice of the presented embodiments.

One or more embodiments may include a fuel cartridge included in a fuel cell system, the fuel cartridge including at least two ports, wherein a first port from among the at least two ports is a fuel inlet port and a second port from among the at least two ports is a fuel outlet port.

According to another embodiment of the present teaching, the fuel cartridge may further include a third port for injecting fuel from outside of the port.

According to another embodiment of the present teaching, the fuel cartridge may further include a fuel pouch. Here, the fuel pouch may be a single-use pouch or a pouch capable of being refilled with the fuel. In this case, the fuel cartridge may further include a third port for injecting the fuel from the outside, and the third port may be connected to the fuel pouch.

According to another embodiment of the present teaching, the fuel cartridge may further include an accommodation space for accommodating the fuel pouch and a storage space for storing some of the fuel in the fuel pouch. Here, the first port and the second port may be connected to the storage space. The fuel pouch accommodated in the accommodation space may be a single-use pouch or a pouch capable of being refilled with the fuel.

According to another embodiment of the present teaching, the fuel cartridge may further include a partition wall interposed between the accommodation space and the storage space, and a connecting member on the partition wall for connecting the fuel pouch accommodated in the accommodation space.

According to another embodiment of the present teaching, the first port and the second port may be disposed in the same direction.

According to another embodiment of the present teaching, the first port may be an inlet through which the fuel flows into the fuel cartridge from the inside of the fuel cell system and an inlet through which the fuel is injected from the outside of the fuel cell system.

According to another embodiment of the present teaching, the fuel cartridge itself may be the fuel pouch.

According to another embodiment of the present teaching, the first port and the second port may be connected to each other using a screw fastening method, a fastening method using female and male screws, and a compression method, or a connection method using a separate connecting member.

One or more embodiments may include a fuel supply module of a fuel cell system, the fuel supply module including: a fuel circulation system that circulates fuel stored in a fuel cartridge along an outer circulating path including the fuel cartridge; and a fuel transmission unit that transmits the fuel from the fuel circulation system to the outside.

According to another embodiment of the present teaching, the fuel circulation system may include: a circulation pump that provides power for pumping the fuel stored in the fuel cartridge so that the fuel stored in the fuel cartridge circulates in the outer circulating path; a pressure regulating chamber that stores the fuel supplied from the circulation pump, maintains its internal pressure to a set pressure, and supplies the fuel to the fuel transmission unit; and a pressure regulator that allows the fuel to be transmitted to the fuel cartridge from the pressure regulating chamber, when the internal pressure of the pressure regulating chamber reaches the set pressure.

According to another embodiment of the present teaching, the circulation pump may have various fuel supply methods according to the pressure regulator.

According to another embodiment of the present teaching, the internal pressure of the pressure regulating chamber may be greater than the external pressure of the fuel transmission unit.

According to another embodiment of the present teaching, the fuel supply module may further include a buffering unit that decreases a change in the internal pressure of the pressure regulating chamber, while the internal pressure of the pressure regulating chamber reaches the set pressure.

According to another embodiment of the present teaching, the fuel supply module may further include a manifold to which the fuel circulation system and the fuel transmission unit are fixed, wherein the manifold includes the pressure regulating chamber, a flow path between elements of the fuel circulation system, and a flow path between the fuel circulation system and the fuel transmission unit.

According to another embodiment of the present teaching, the pressure regulator may include a nozzle that generates constant resistance with respect to fuel flowing via the nozzle.

According to another embodiment of the present teaching, the pressure regulator may include a valve opened above a constant pressure.

According to another embodiment of the present teaching, the manifold may include a cover on one side thereof defining a space accommodating changes according to the change in the internal pressure of the pressure regulating chamber and a buffering film interposed between the cover and the one side of the manifold decreasing the change in the internal pressure of the pressure regulating chamber.

According to another embodiment of the present teaching, the circulation pump may be a pump in which operation thereof is set to supply the fuel to the pressure regulating chamber in a constant amount.

According to another embodiment of the present teaching, the circulation pump may be a pump in which operation thereof is set to change the amount of the fuel supplied to the pressure regulating chamber within a selected range.

According to another embodiment of the present teaching, the fuel supply module may further include a pressure sensor measuring the internal pressure of the fuel supply module.

One or more embodiments may also include a fuel cell system having a fuel cartridge, a fuel supply module, a mixer, a feed pump, and a stack. Here, the fuel supply module and the fuel cartridge may be the same as described above.

One or more embodiments may include an electronic apparatus including a fuel cell system. Here, the fuel cell system may be described above.

According to embodiments, the circulation pump having a greater capacity than that of a general fuel pump is used so as to rapidly supply the fuel to the valve. Accordingly the self-priming time may be reduced and self-priming fails may be prevented.

In addition, flux change of the fuel with respect to the pressure change of a fuel supply line may be reduced within a range. In other words, the fuel having the high pressure is rapidly ejected through the valve so that change of the fuel with respect to the pressure change of the fuel supply line may be reduced within a selected range.

Moreover, flux change of the fuel according to the resistance of the fuel cartridge and the remaining amount of the fuel may be reduced. That is, the circulation pump having a greater capacity is used to maintain the internal pressure of the pressure regulating chamber so that even if the pressure of the fuel cartridge is changed due to changes in the location of the fuel cartridge and the amount of the fuel stored in the fuel cartridge, the amount of the fuel supplied from the valve to the mixer is not changed. If there is a change in the amount of the fuel, such change does not affect to the operation of the fuel cell system, because such change is very small.

According to another embodiment of the present teaching, sensors controlling fuel concentration and fuel flow, and a control program are not needed. That is, fuel supply rate may be uniformly maintained within a permitted range with respect to pressure change in the flow path in the fuel cell system so that a separate fuel supply rate controlling unit such as the sensors for controlling fuel concentration and fuel flow, and a control program are not needed.

According to another embodiment of the present teaching, a desired amount of the fuel may be supplied without controlling through a set value for valve operation. That is, a desired amount of the fuel may be supplied without separately controlling the valve by setting an on/off period of the valve according to the output of the stack.

According to another embodiment of the present teaching, a cost of the fuel cell system may be reduced. That is, a high-cost minute pump supplying a small amount of the fuel is not needed and sensors controlling fuel concentration and fuel flow are not needed. Instead of the precision pump and the sensors, low-cost valve and pump may be used to supply the fuel, thereby reducing a cost of the fuel cell system.

According to another embodiment of the present teaching, the low-cost valve and pump could be widely available for various types of fuel supplies. For example, when a plurality of stacks are included in one fuel cell system, if the valve is included with each stack, a desired amount of the fuel may be supplied to each stack.

Additional aspects and/or advantages of the teaching will be set forth in part in the description which follows and, in part, will be obvious from the description, or may be learned by practice of the teaching.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
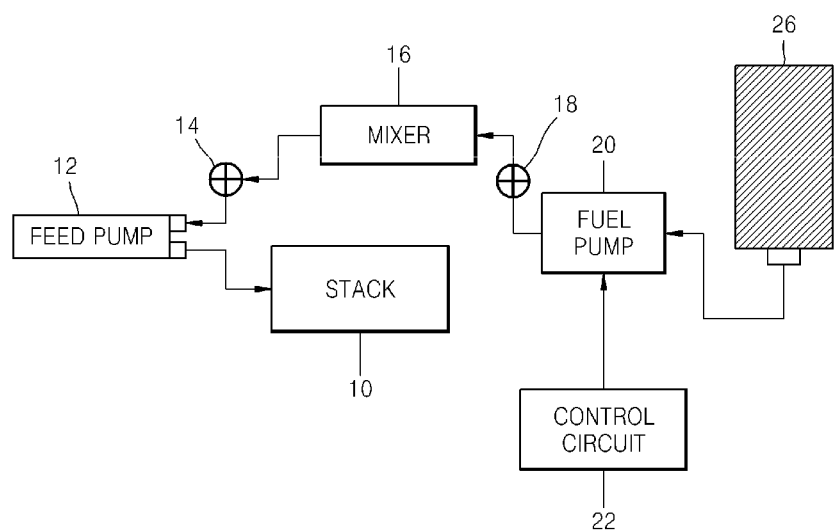
FIG. 1 is a block diagram of a general fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a fuel cell system having a fuel circulation structure, a method of operating the fuel cell system, and an electronic apparatus including the fuel cell system will be described more fully with reference to the accompanying drawings. In the drawings, the sizes and thicknesses of layers and regions are exaggerated for clarity.

Figure 2:
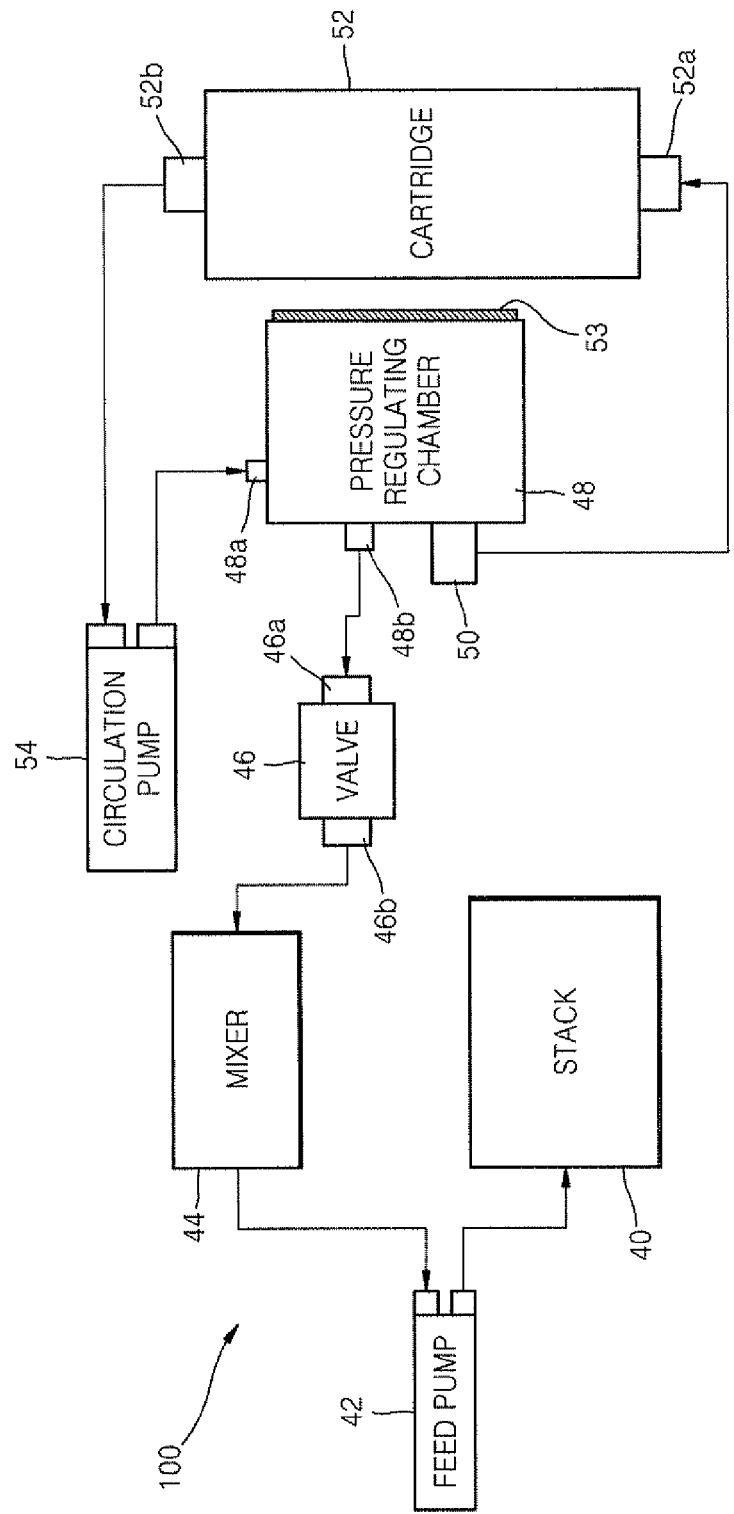
FIG. 2 is a block diagram of a fuel cell system according to an embodiment of the present invention.

First, the fuel cell system having a fuel circulation structure is described with reference to FIG. 2. FIG. 2 is a block diagram of a fuel cell system 100 according to an embodiment of the present invention.

Referring to FIG. 2, the fuel cell system 100 (hereinafter, referred to as a system) according to an embodiment of the present invention includes a stack 40 and a fuel cartridge 52. The stack 40 includes at least one membrane electrode assembly (MEA) and generates electricity and the fuel cartridge 52 stores fuel to be supplied to the stack 40. The fuel cell system 100 includes one stack 40. However, the fuel cell system 100 may include a plurality of stacks 40. In this case, the number of parts of or all of the elements relating to supplying the fuel to the stack 40 may be as many as the number of stacks 40. For example, the number of fuel transmission units may be the same as the number of stacks 40. The fuel cartridge 52 may store high concentration fuel, for example, methanol having a concentration of 100%. The concentration of the fuel may be lower than 100%. The fuel cartridge 52 may include at least first and second ports 52*a* and 52*b*. The first port 52*a* may be an inlet or a nozzle to which circulated fuel is input. The second port 52*b* may be an outlet or a nozzle from which the fuel is discharged from the fuel cartridge 52. The first port 52*a* may be also used as a fuel inlet for injecting fuel to the fuel cartridge 52 from the outside. In order to inject the fuel to the fuel cartridge 52 from the outside, the fuel cartridge 52 may include a separate fuel injection hole, in addition to the first and second ports 52*a* and 52*b*. The first port 52*a* may be connected to a pressure regulator 50 using a screw fastening method, a fastening method using female and male screws, and a compression method, or using a separate connecting unit. The first port 52*a* may have an appropriate connection structure for the connection between the first port 52*a* and the pressure regulator 50. The second port 52*b* may be connected to a circulation pump 54 using the connecting methods described above, and may have an appropriate connection structure for the connection. The first and second ports 52*a* and 52*b* may be disposed at different locations from those of FIG. 2. For example, the fuel cartridge 52 may include the first and second ports 52*a* and 52*b* at left and right sides thereof or the fuel cartridge 52 may include both of the first and second ports 52*a* and 52*b* at one side. Also, the separate fuel injection hole may be disposed on the other side. In addition, the first and second ports 52*a* and 52*b* may be concavely disposed in the fuel cartridge 52, instead of protruding as illustrated in FIG. 2. Also, the separate fuel injection hole may be concavely disposed in the fuel cartridge 52. The fuel cartridge 52 may have an internal structure including a fuel pouch therein. In addition, the fuel cartridge 52 itself may be a fuel pouch, and the fuel cartridge 52 of this case will be described later. The fuel cartridge 52 may have different forms such as a cylindrical form, a square form, or a flat form.

The system 100 also includes a mixer 44 and a pressure regulating chamber 48 interposed between the stack 40 and the fuel cartridge 52. The mixer 44 dilutes high concentration fuel supplied from the fuel cartridge 52 to low concentration fuel to be appropriately supplied to the stack 40. Accordingly, the high concentration fuel supplied to the mixer 44 is diluted in the mixer 44 with a residual generated during the operating of the stack 40. A residual is low concentration methanol in which water and non-reacted methanol generated during the operating of the stack 40 are mixed, passed through a recycler (not shown), and input to the mixer 44.

Internal pressure of the pressure regulating chamber 48 is maintained constant and the pressure regulating chamber 48 maintains the fuel supplied from the fuel cartridge 52 through the circulation pump 54 to a selected pressure. The pressure regulating chamber 48 may include a fuel storage or a space therein for storing the fuel supplied from the circulation pump 54. The circulation pump 54 is interposed between the second port 52*b*, which is an outlet terminal of the fuel cartridge 52, and a fuel inlet terminal 48*a* of the pressure regulating chamber 48, and is connected to the second port 52*b* and the fuel inlet terminal 48*a*. The circulation pump 54 receives the fuel stored in the fuel cartridge 52 and supplies the fuel to the pressure regulating chamber 48. Accordingly, the fuel stored in the fuel cartridge 52 is circulated.

Internal pressure of the pressure regulating chamber 48 may be greater than pressure (hereinafter, external pressure) applied to an outlet terminal 46*b* of a valve 46. For example, when the external pressure is denoted as P2, P2 may be about $-5\ kPa < P2 <$ about $5\ kPa$ and the internal pressure of the pressure regulating chamber 48 may maintain a high constant level greater than about 150 kPa. The error of supplying fuel rate from the valve 46*b* may be lower than ±5%.

As such, since the internal pressure of the pressure regulating chamber 48 is relatively high, even if the pressure of the fuel cartridge 52 changes due to the resistance of the fuel cartridge 52 and a remaining amount of the fuel stored in the fuel cartridge 52 changes, the internal pressure of the pressure regulating chamber 48 may be constant. The pressure regulating chamber 48 may include a member maintaining the internal pressure of the pressure regulating chamber 48 so as to maintain the internal pressure of the pressure regulating chamber 48 within a permissible range due to external influences. For example, a buffering film 53 may be disposed on the outer wall of the pressure regulating chamber 48 buffering changes of the internal pressure of the pressure regulating chamber 48. While operating the circulation pump 54, pulsations may be generated and may be transmitted to the pressure regulating chamber 48, thereby changing the internal pressure of the pressure regulating chamber 48. Here, a part of the buffering film 53 is displaced due to the pulsations. That is, according to the intensity of the pulsations, a center part of the buffering film 53 may be convex or concave. When the pulsations disappear, the buffering film 53 maintains its original shape. Accordingly, the internal pressure of the pressure regulating chamber 48 may be constant. The pressure regulating chamber 48 includes the fuel inlet terminal 48*a* and a fuel outlet terminal 48*b*. The fuel outlet terminal 48*b* is connected to the fuel storage included in the pressure regulating chamber 48. The fuel flows in the pressure regulating chamber 48 from the circulation pump 54 through the fuel inlet terminal 48a and is supplied to an inlet terminal 46a of the valve 46 through the fuel outlet terminal 48b. The inlet terminal 46a of the valve 46 and the fuel outlet terminal 48b of the pressure regulating chamber 48 may be connected to each other using a screw fastening method, a fastening method using female and male screws, and a compression method, or a connection method using a separate connecting unit.

The amount of the high concentration fuel supplied from the valve 46 to the mixer 44 may be adjusted by regulating the valve 46. The regulating of the valve 46 may be set according to the electric power generation level of the stack 40. For example, according to the power level of the stack 40, the numbers of on/off times of the valve 46 are set and thus the fuel needed in the stack 40 may be uniformly supplied to the stack 40 without a separate sensor such as a methanol concentration sensor. The valve 46 is interposed between the mixer 44 and the pressure regulating chamber 48 and may be, for example, a solenoid valve.

The system 100 includes a feed pump 42 interposed between the stack 40 and the mixer 44. The feed pump 42 supplies the diluted fuel supplied from the mixer 44 to the stack 40 according to operation of the stack 40. The system 100 also includes the pressure regulator 50 interposed between the pressure regulating chamber 48 and the fuel cartridge 52. One end of the pressure regulator 50 is connected to the pressure regulating chamber 48 and the other end of the pressure regulator 50 is connected to the first port 52a, which is an input terminal of the fuel cartridge 52. The one end of the pressure regulator 50 may be connected to an outlet of the fuel storage included in the pressure regulating chamber 48. The fuel flowing from the circulation pump 54 to the pressure regulating chamber 48 passes through the pressure regulator 50 and flows to the fuel cartridge 52.

In consideration of a flow path of the fuel, a fuel circulation path is formed by the circulation pump 54, the pressure regulating chamber 48, the pressure regulator 50, and the fuel cartridge 52. Also, a fuel circulation system or a fuel circulation module may be formed by the circulation pump 54, the pressure regulating chamber 48, and the pressure regulator 50 for circulating the fuel stored in the fuel cartridge 52. In terms of the fuel circulation system, the valve 46 may be denoted as a fuel transmission unit which transmits the fuel supplied from the fuel circulation system to the outside, that is, the stack 40.

The internal pressure of the pressure regulating chamber 48 may be higher than the external pressure of the pressure regulator 50. The pressure regulator 50 may be a member for increasing the internal pressure of the pressure regulating chamber 48 to a selected pressure. The pressure regulator 50 may be a first member, which allows the fuel to flow above the selected pressure, or a second member, which allows the fuel to flow and generates selected resistance, thereby increasing the internal pressure of the pressure regulating chamber 48.

When the pressure regulator 50 is the first member, that is, the pressure regulator 50 allows the fuel to flow above the selected pressure, the operation of the circulation pump 54 continues after the system 100 starts operating. Here, since the circulation pump 54 has a greater fuel-supplying capacity than that of a general fuel pump, the circulation pump 54 may supply the fuel to the pressure regulating chamber 48 with pressure above the pressure for opening the pressure regulator 50. Thus, the internal pressure of the pressure regulating chamber 48 may increase to the pressure for opening the pressure regulator 50. When the internal pressure of the pressure regulating chamber 48 is the pressure for opening the pressure regulator 50 due to continuous operation of the circulation pump 54, the pressure regulator 50 is opened and the fuel may flow from the pressure regulating chamber 48 to the fuel cartridge 52. Accordingly, when the internal pressure of the pressure regulating chamber 48 is set to a selected value during the manufacturing of the system 100, the pressure regulator 50 may be set to open under the pressure set in the pressure regulating chamber 48. Accordingly, the internal pressure of the pressure regulating chamber 48 may be maintained at the set pressure.

When the pressure regulator 50 is the second member, that is, the pressure regulator 50 allows the fuel to flow and generate selected resistance, the fuel uniformly supplied from the circulation pump 54 to the pressure regulating chamber 48 may flow to the fuel cartridge 52 through the pressure regulator 50. However, due to a selected resistance with respect to fuel flowing via the pressure regulator 50, the amount of the fuel flowing to the fuel cartridge 52 through the pressure regulator 50 is less than the amount of the fuel supplied from the circulation pump 54 to the pressure regulating chamber 48. Accordingly, the internal pressure of the pressure regulating chamber 48 may increase to above the set pressure. When the internal pressure of the pressure regulating chamber 48 reaches the set pressure, the resistance with respect to fuel flowing via the pressure regulator 50 is set to be the same as the amount of the fuel that discharges through the pressure regulator 50 and the amount of the fuel flowing into the pressure regulating chamber 48, thereby maintaining the internal pressure of the pressure regulating chamber 48 as the set pressure. The first member may be a valve opened only at a selected pressure or greater, for example, a check valve. The second member may be a nozzle formed to have a selected resistance with respect to fuel flowing via the second member. When the pressure regulator 50 is the first member, the circulation pump 54 may be set to supply the fuel to the pressure regulating chamber 48 in a range. When the pressure regulator 50 is the second member, the amount of the fuel supplied from the circulation pump 54 to the pressure regulating chamber 48 may be set so that the amount of the fuel supplied to the pressure regulating chamber 48 is uniform. Here, the supply amount of the fuel set in the circulation pump 54 may be the same as the amount of the fuel that discharges through the pressure regulator 50, when the internal pressure of the pressure regulating chamber 48 is the set pressure. Accordingly, after the internal pressure of the pressure regulating chamber 48 reaches the set pressure, the internal pressure of the pressure regulating chamber 48 may be prevented from continuously increasing.

In the system 100, the fuel stored in the fuel cartridge 52 is forced to be circulated by the circulation pump 54, and the pressure regulating chamber 48 maintains a higher pressure than the external pressure. Thus, fuel supply rate may be uniformly maintained regardless of directivity of the fuel cartridge 52 and the amount of fuel remaining in the fuel cartridge 52.

In addition, since the fuel is rapidly ejected through the valve 46 while the pressure regulating chamber 48 maintains a high pressure, changes in the ejection amount that originated by pressure deviations on a fuel supply line may be reduced.

Moreover, as the fuel is forced to be absorbed from the fuel cartridge 52 using the circulation pump 54, even if there is gas in a fuel supply pipe interposed between the circulation pump 54 and the fuel cartridge 52, the gas may be rapidly removed. Also, as the circulation pump 54 has a capacity greater than that of the general fuel pump, the fuel may be rapidly supplied to the valve 46, thereby reducing the self-priming time and preventing self-priming failures.

Then, when the internal pressure of the pressure regulating chamber 48 is higher than the external pressure in the system 100, the amount of the fuel supplied to the mixer 44 from the valve 46 may be uniform, as will be described with reference to FIG. 3.

Figure 3:
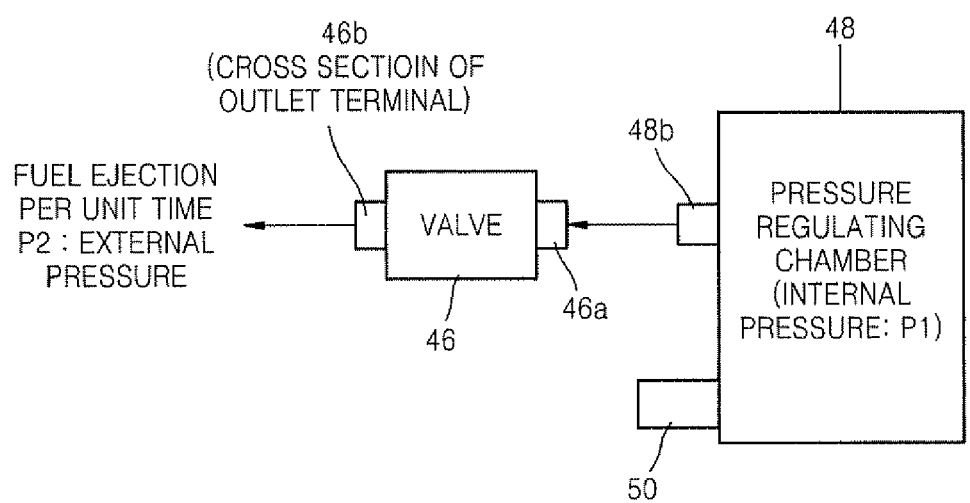
FIG. 3 is a reference diagram explaining that fuel may be uniformly supplied when internal pressure of a pressure regulating chamber is higher than the external pressure in the fuel cell system of FIG. 2.

FIG. 3 is a reference diagram explaining that fuel may be uniformly supplied when internal pressure of the pressure regulating chamber 48 is higher than external pressure in the system 100 of FIG. 2.

Referring to FIG. 3, the internal pressure of the pressure regulating chamber 48 is denoted as P1 and P1 is regarded as constant. In addition, an area of the outlet terminal 46b of the valve 46, that is, an area of an ejection opening, is denoted as $A_2$, the amount of the fuel ejected per hour is denoted as M2, and the pressure of the outlet terminal 46b, that is, the external pressure, is denoted as P2.

Here, P1, P2, M2, and $A_2$ are defined by Formula 1.

$$\dot{M}_2 = A_2\sqrt{2\rho(P1-P2)} \quad \text{[Formula 1]}$$

In Formula 1, ρ represents the density of the fuel, for example, the density of methanol.

When P2 is changed in Formula 1, P1 or A2 may be changed in order to change the value of M2 (the value shown on the left of Formula 1) to be within a permitted range (for example, 0.5 g/minute). $A_2$ and the density of the fuel, ρ, are constant. Thus, when P1 is much greater than P2, the changes of M2 according to the change of P2 may be uniformly maintained within a permitted range.

The internal pressure P1 of the pressure regulating chamber 48 is far greater than the external pressure P2 of the outlet terminal 46b of the valve 46 due to the circulation pump 54 and the pressure regulator 50 in the system 100 of FIG. 2. Thus, although the external pressure P2 is changed, the amount of the fuel supplied to the mixer 44 from the valve 46, that is, the amount of the fuel ejected M2, may be uniformly maintained within a permitted range.

Figure 4:
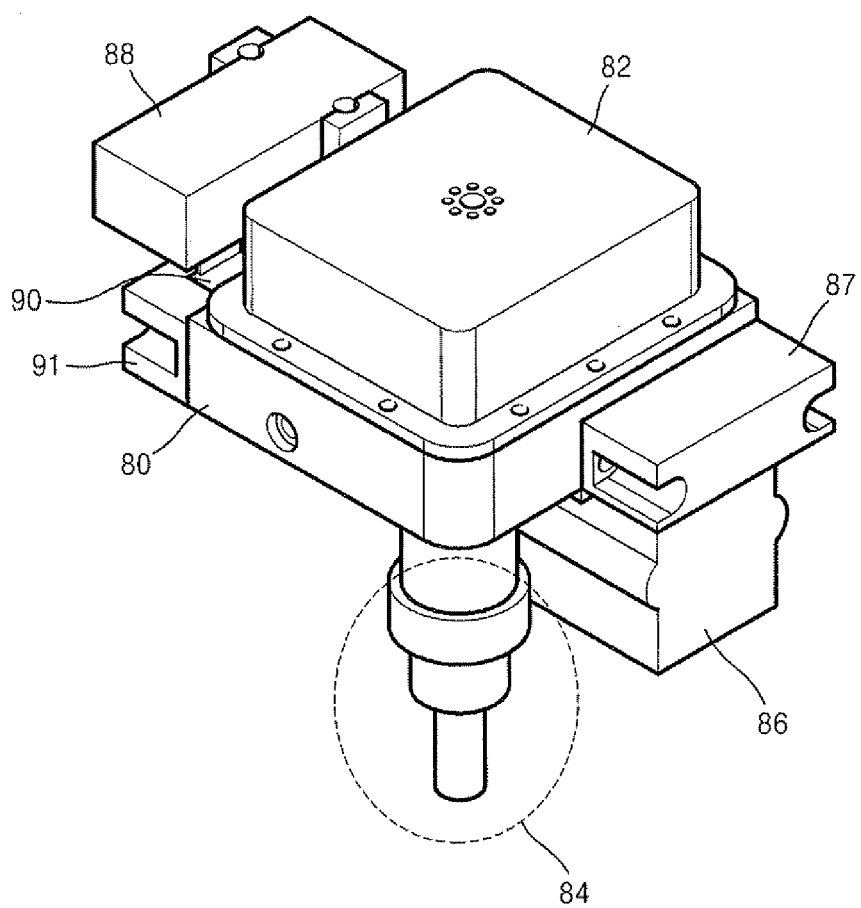
FIG. 4 is a top perspective view in detail illustrating a fuel supply module in the fuel cell system of FIG. 2.

The fuel supply system including the valve 46, the pressure regulating chamber 48, the pressure regulator 50, and the circulation pump 54 in the system 100 of FIG. 2 may be modularized. FIG. 4 is a top perspective view illustrating a fuel supply module, and FIG. 5 is a top exploded perspective view of the fuel supply module of FIG. 4.

Referring to FIG. 4, the fuel supply module includes a manifold 80 including a pressure regulating chamber. The pressure regulating chamber included in the manifold 80 may correspond to the pressure regulating chamber 48. Elements included in the fuel supply module are fixed to the manifold 80. The manifold 80 includes a fuel supply path between the elements included in the fuel supply module. The pressure regulating chamber is covered by a cover 82 that provides a space adapting to changes in the pressure of the pressure regulating chamber when the pressure is higher or lower than a set pressure. The fuel supply module also includes a pressure regulator 84, a circulation pump 86, a valve 88, and a pressure sensor 90. The pressure regulator 84 may correspond to the pressure regulator 50, the circulation pump 86 may correspond to the circulation pump 54, and the valve 88 may correspond to the valve 46. The circulation pump 86 may be fixed to the manifold 80 using a first fixing member 87, and the pressure sensor 90 may be fixed to the manifold 80 using a second fixing member 91.

Figure 5:
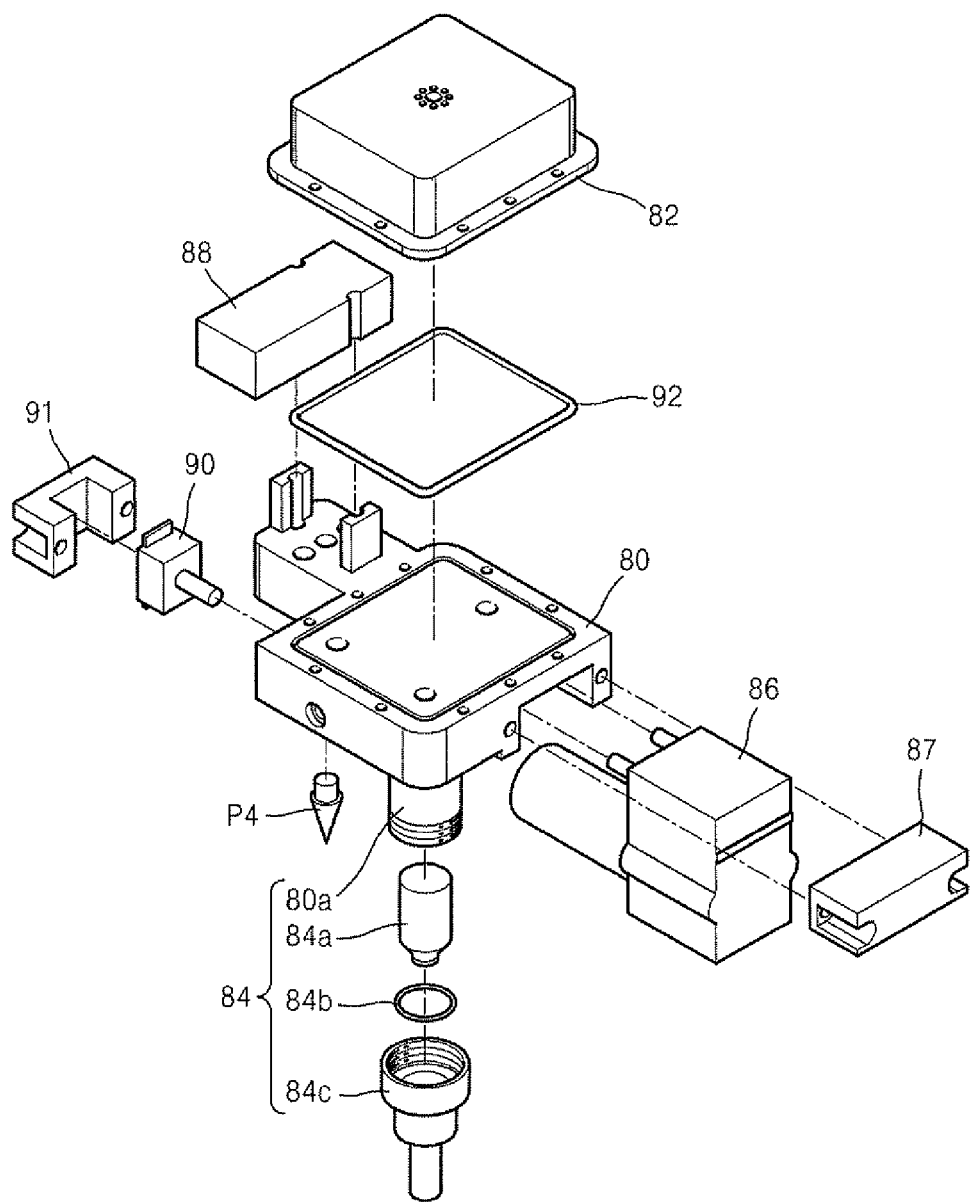
FIG. 5 is a top exploded perspective view of the fuel supply module of FIG. 4.

Referring to FIG. 5, a rubber film 92 is interposed between the cover 82 and the manifold 80. The rubber film 92 may correspond to the buffering film 53 of FIG. 2. When the pressure of the pressure regulating chamber is different from the set pressure due to pulsations generated in the circulation pump 86, for example, greater than the set pressure, the rubber film 92 may project into the cover 82. Alternately, when the pressure of the pressure regulating chamber is lower than the set pressure due to the pulsation, the rubber film 92 may project into the manifold 80. The pressure regulator 84 includes a manifold connecting member 80a, a relief valve 84a, an o-ring 84b, and a relief valve fixing member 84c. The pressure of the pressure regulating chamber may be maintained at the set pressure by the relief valve 84a. When the relief valve 84a is opened, the fuel may flow from the pressure regulating chamber to a fuel cartridge. The fuel supply module also includes an injection nozzle 94. The fuel having the high pressure is supplied to the mixer 44 from the valve 88 through the injection nozzle 94, which is connected to the mixer 44. Thus, the injection nozzle 94 may correspond to the outlet terminal 46b of the valve 46. The injection nozzle 94 may be an orifice valve.

Figure 6:
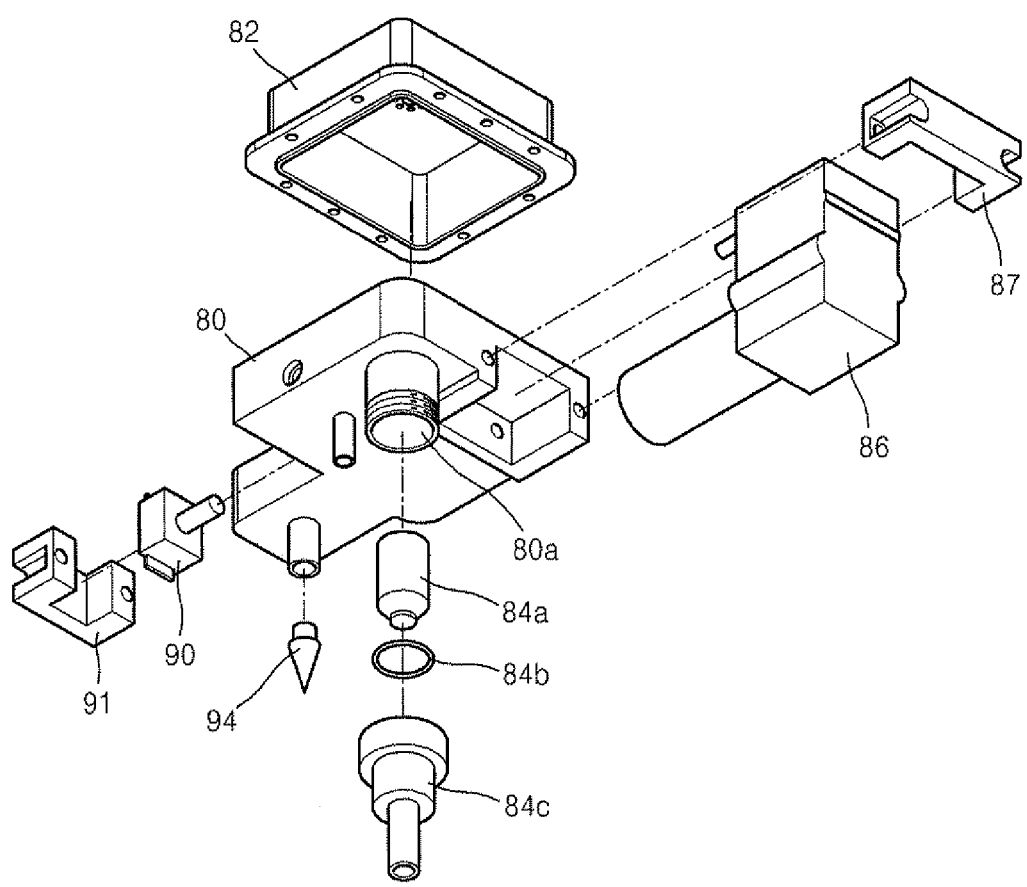
FIG. 6 is a bottom exploded perspective view of the fuel supply module of FIG. 4.

FIG. 6 is a bottom exploded perspective view of the fuel supply module of FIG. 4. In FIG. 6, the valve 88 is not shown.

Figure 7:
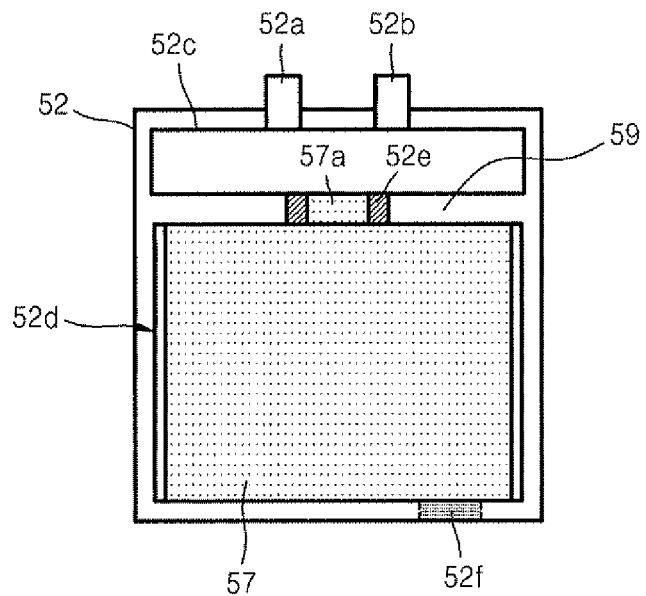
FIGS. 7-9 are plane views illustrating modifications of a fuel cartridge in the fuel cell system of FIG. 2.
Figure 8:
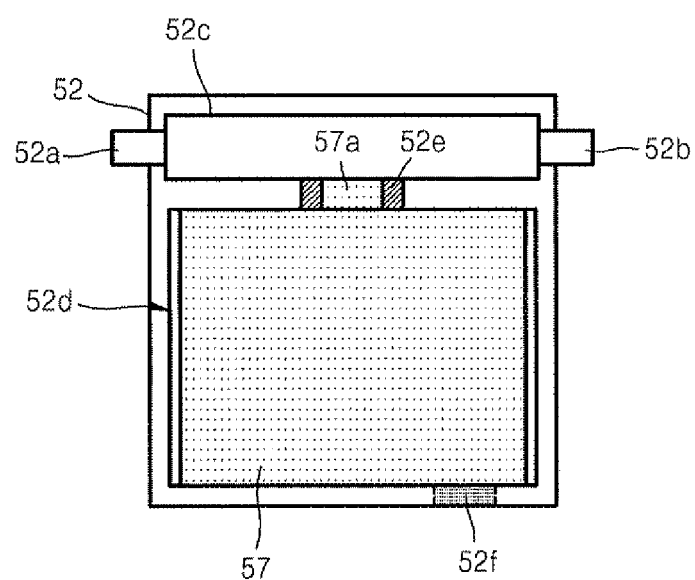
Figure 9:
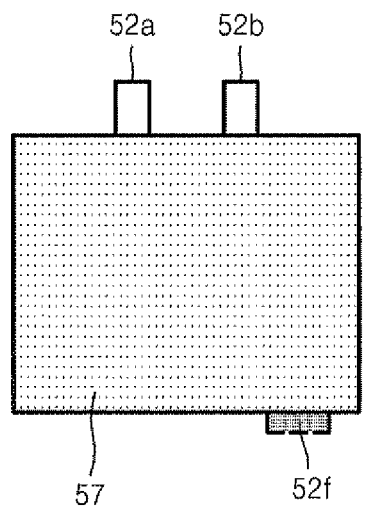

Modifications of the fuel cartridge 52 are described with reference to FIGS. 7-9. FIGS. 7-9 are plane views illustrating modifications of the fuel cartridge 52 in the system 100 of FIG. 2.

Referring to FIG. 7, the fuel cartridge 52 includes a storage space 52c and an accommodation space 52d that are spaced apart from each other. Some of the fuel in a fuel pouch 57 is stored in the storage space 52c. The accommodation space 52d accommodates the fuel pouch 57. Connecting members 52e are disposed on a partition wall 59 interposed between the storage space 52c and the accommodation space 52d. A fuel discharging unit 57a of the fuel pouch 57 is connected to the connecting members 52e using a screw fastening method, a fastening method using female and male screws, and a compression method, a connection method using a separate connecting unit or any other method used for connecting the elements. Such connecting methods may be applied to the connecting of the other elements in the system 100. The first and second ports 52a and 52b are connected to the storage space 52c in the fuel cartridge 52. The first and second ports 52a and 52b are spaced apart from each other and are provided in the same direction. The first and second ports 52a and 52b may be provided in different directions, as illustrated in FIG. 8. The fuel cartridge 52 may include a third port 52f, which is connected to the fuel pouch 57, as a port for injecting the fuel into the fuel pouch 57. The third port 52f may be disposed in a different location from the fuel discharging unit 57a, for example, below the fuel discharging unit 57a, when the fuel discharging unit 57a is disposed above the fuel pouch 57, and the outer surface of the third port 52f may be exposed to the outside.

In addition, the fuel cartridge 52 itself may be the fuel pouch 57, as described with reference to FIG. 9.

Referring to FIG. 9, the first and second ports 52a and 52b may be directly connected to the fuel pouch 57. The first and second ports 52a and 52b may be provided in the same direction as illustrated in FIG. 9. However, any one of the first and second ports 52a and 52b may be provided in a different direction. The first port 52a may be used as an outside fuel injection hole for injecting the fuel to the fuel pouch 57. However, the fuel pouch 57 may separately include the third port 52f to inject the fuel from the outside through the third port 52f.

Experiments conducted on the system 100 are described below.

Experimental Example 1

In Experimental Example 1, a change of an amount of the fuel M2 supplied from the valve 46 to the mixer 44 due to a difference between the external pressure P2 of the outlet terminal 46*b* and the internal pressure of the pressure regulating chamber 48 was measured. This Experimental Example 1 is conducted for a fuel supplying system including the valve 46, the pressure regulating chamber 48, the pressure regulator 50, the fuel cartridge 52, and the circulation pump 54 of FIG. 2. In this Experimental Example 1, the stack 40 and the elements connected to the stack 40, for example, the feed pump 42 and the recycler, through which water and non-reacted methanol pass, are not connected to the fuel supplying system. The Experimental Example 1 is conducted according to two cases. One is when the internal pressure of the pressure regulating chamber 48 is at 200 kPa (hereinafter, referred to as case 1) and the other is when the internal pressure of the pressure regulating chamber 48 is at 250 kPa (hereinafter, referred to as case 2). In cases 1 and 2, the external pressure P2 is changed from about 2 to about 13 kPa. Also, when the fuel supplying system is connected to the stack 40, a target fuel supply amount is reduced by half so that the target fuel supply amount is set to 0.15 cc/min in the Experimental Example 1.

In addition, operational conditions of the fuel supplying system are set as shown in Table 1.

TABLE 1

|  | 200 kPa | 250 kPa |
| --- | --- | --- |
| Motor Voltage (V) | 2.4 | 5.4 |
| Valve Voltage (V) | 12 | 12 |
| Nozzle size 1 (mm) | 0.1 | 0.2 |
| Nozzle size 2 (mm) | 0.1 | 0.2 |
| Period (ms) | 760 | 5000 |
| ON time (ms) | 0.035 | 0.03 |

In Table 1, the "motor voltage" is voltage applied to operating a motor of the circulation pump 54. The "valve voltage" is voltage for operating the valve 46. The "nozzle size 1" is the size of the outlet terminal 46*b* of the valve 46 connected to the mixer 44. The size of the injection nozzle 94 in FIG. 5 may correspond to that of the "nozzle size 1." The "nozzle size 2" is the size of a nozzle included in the pressure regulator 50. The "period" denotes an on/off period of the valve 46. The "ON time" denotes the time the valve 46 is maintained open, that is, the opening time of the valve 46.

Figure 10:
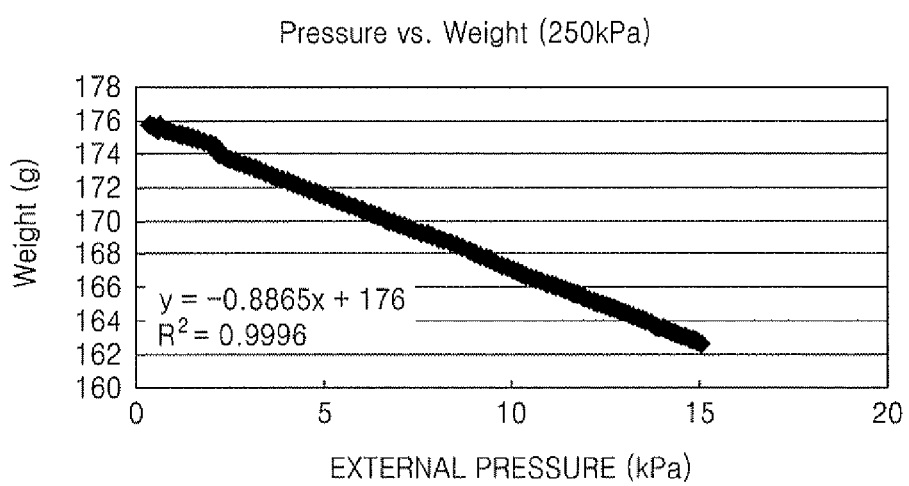
FIGS. 10-12 are graphs showing results of Experimental Example 1.
Figure 11:
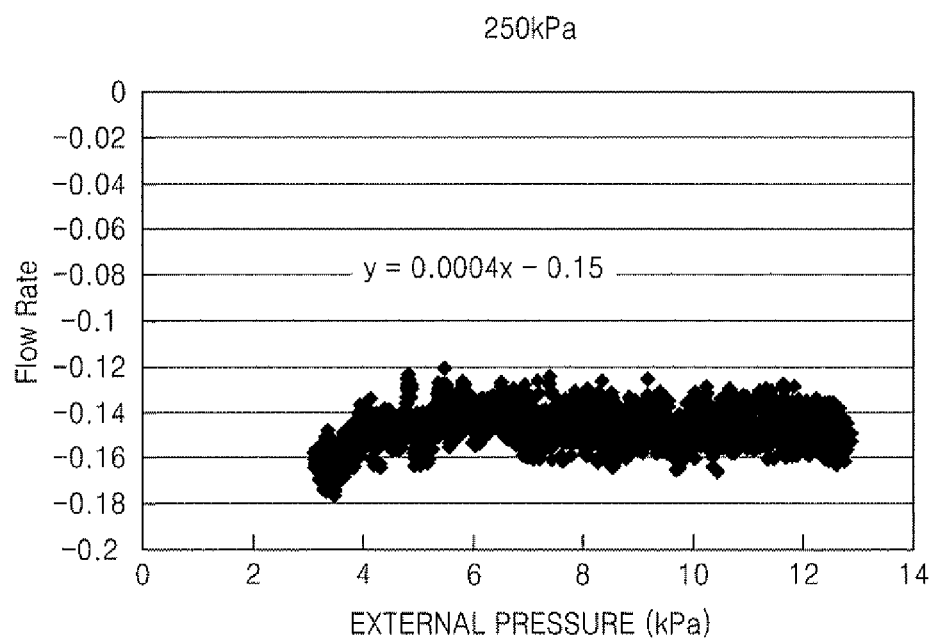

FIGS. 10-11 are graphs showing the results of Experimental Example 1. FIG. 10 shows the change in the remaining amount of the fuel in the fuel cartridge 52 according to the external pressure of the outlet terminal 46*b* of the valve 46 while operating the fuel supplying system.

Referring to FIG. 10, according to the change in the external pressure, the remaining amount of the fuel in the fuel cartridge 52 is constantly reduced.

From the result shown in FIG. 10, the amount of the fuel consumed from the fuel cartridge 52 is constant regardless of the external pressure of the outlet terminal 46*b* of the valve 46. The result denotes that the amount of the fuel ejected from the valve 46 is constant regardless of the external pressure of the outlet terminal 46*b* of the valve 46 as also illustrated in FIG. 11.

FIG. 11 shows the change in the amount of the fuel ejected M2 from the outlet terminal 46*b* of the valve 46 according to the change of the external pressure of the outlet terminal 46*b* of the valve 46 while operating the fuel supply system.

Referring to FIG. 11, the amount of the fuel ejected M2 from the outlet terminal 46*b* of the valve 46 according to the change of the external pressure of the outlet terminal 46*b* of the valve 46 is constant at about 0.15 cc/min. The result shown in FIG. 11 denotes that change rate per unit time of the amount of the fuel ejected M2 from the outlet terminal 46*b* of the valve 46 is constant regardless of the external pressure of the outlet terminal 46*b* of the valve 46. In other words, the speed for supplying the fuel through the valve 46 is constant regardless of the external pressure of the outlet terminal 46*b* of the valve 46.

From the results shown in FIGS. 10 and 11, when the fuel supplying system is used, a constant amount of the fuel may be supplied regardless of the external pressure.

Figure 12:
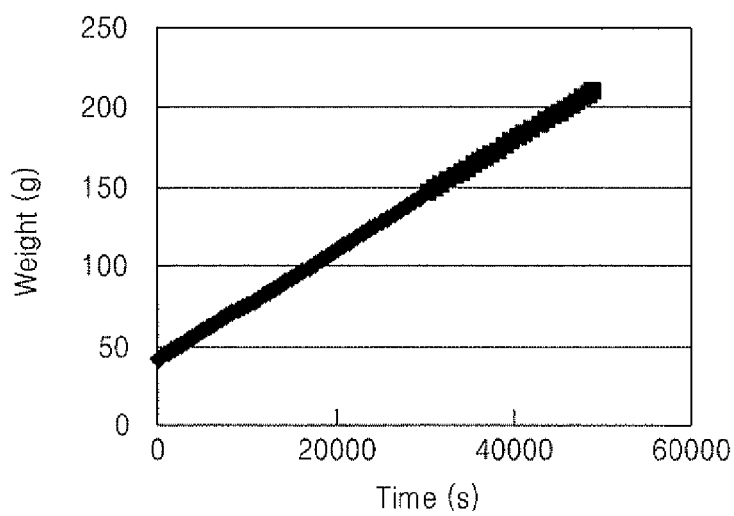

FIG. 12 is a graph showing the result obtained by measuring the change in an accumulated amount of consumed fuel or an accumulated amount of ejected fuel versus time in the fuel supply system. The result shown in FIG. 12 is obtained by measuring the performance of the fuel system for 14 hours. Referring to FIG. 12, the accumulated amount of consumed fuel (accumulated amount of ejected fuel) versus time uniformly increases. From the result shown in FIG. 12, although the fuel supply system is used for a long period of time, uniform results can be observed from FIGS. 10 and 11. That is, although the fuel supply system is used for a long period of time, the fuel stored in the fuel cartridge 52 is reduced in a uniform ratio and the amount of the fuel ejected through the valve 46 may also be constant.

Experimental Example 2

In Experimental Example 2, an experiment is conducted on the fuel cell system 100 of FIG. 2, that is normally operated, including the fuel supply system used in Experimental Example 1. Experimental Example 2 is conducted for more than 15 hours. In this experiment, the fuel supply system used in Experimental Example 1 is connected to the stack 40 and the elements connected to the stack 40, for example, other remaining elements such as an air pump, a feed pump, and the recycler. In the fuel cell system of Experimental Example 2, feedback control is not used and an initial flow value is not changed after being set.

Figure 13:
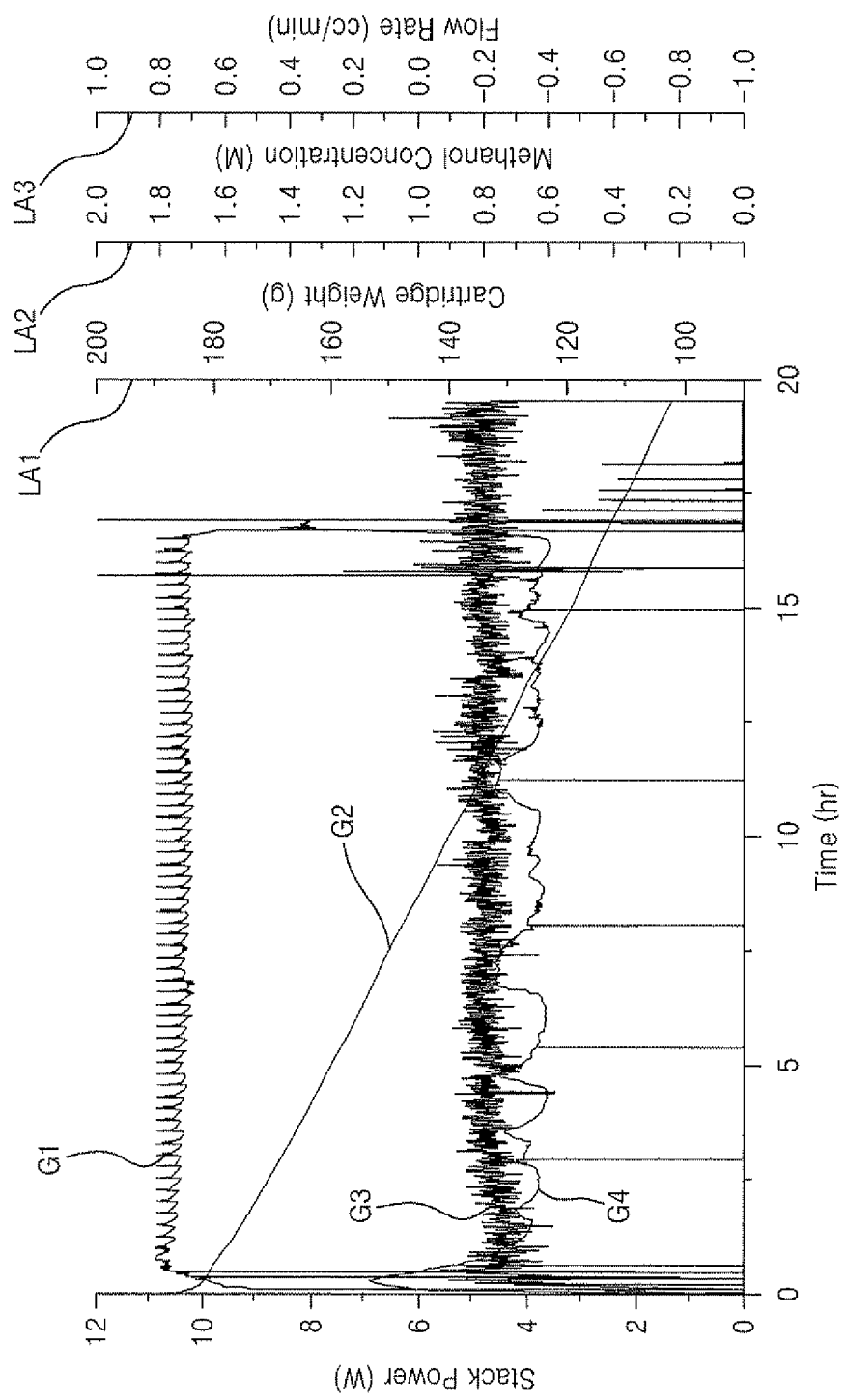
FIG. 13 is a graph showing results of Experimental Example 2.

FIG. 13 is a graph showing the result of Experimental Example 2. G1 in FIG. 13 shows the output of the stack 40, G2 shows a fuel decrease in the fuel cartridge 52, G3 shows the fuel flow rate (cc/min) ejected M2 from the valve 46, that is, the amount of the fuel supplied to the mixer 44 through the valve 46, and G4 shows the change of concentration of the fuel supplied to the stack 40. A vertical axis represents stack power and first through third vertical axes LA1-LA3 respectively represent the weight g of the fuel cartridge 52, methanol concentration M, and flow rate (cc/min).

Referring to FIG. 13, the fuel flow rate and the fuel concentration are maintained constant within a permitted range for a long period of time. In addition, the fuel decrease rate of the fuel cartridge 52 is constant according to time.

Now, the operating of the system 100 will be described.

Referring back to FIG. 2, when the pressure of the pressure regulating chamber 48 reaches the set pressure due to the operation of the circulation pump 54, the high concentration fuel stored in the fuel cartridge 52 is sequentially circulated in the circulation pump 54, the pressure regulating chamber 48, the pressure regulator 50, and the fuel cartridge 52. In this fuel circulation, according to the constitution of the pressure regulator 50, a pumping form of the circulation pump 54 may vary. For example, when a nozzle having a size to have a resistance with respect to fuel flowing via the nozzle is disposed at a fuel outlet side of the pressure regulator 50, the circulation pump 54 may supply the fuel in a constant flow to the pressure regulating chamber 48. Moreover, when a valve generating a selected pressure is disposed in the fuel outlet of the pressure regulator 50, that is, a valve opened at the selected pressure, the circulation pump 54 may adjust the amount of the fuel supplied to the pressure regulating chamber 48 to be within a particular range.

As such, while the fuel is circulated, the fuel is supplied to the valve 46 through the fuel outlet terminal 48b of the pressure regulating chamber 48. The valve 46 supplies the high concentration fuel to the mixer 44 according to the on/off time previously set based on the output of the stack 40. The mixer 44 mixes the high concentration fuel supplied from the valve 46 with residuals generated during the generating of electricity by the stack 40, thereby generating fuel having concentration appropriate to be supplied to the stack 40. The fuel generated in the mixer 44 is supplied to the feed pump 42. The feed pump 42 supplies the fuel received from the mixer 44 to the stack 40.

Figure 14:
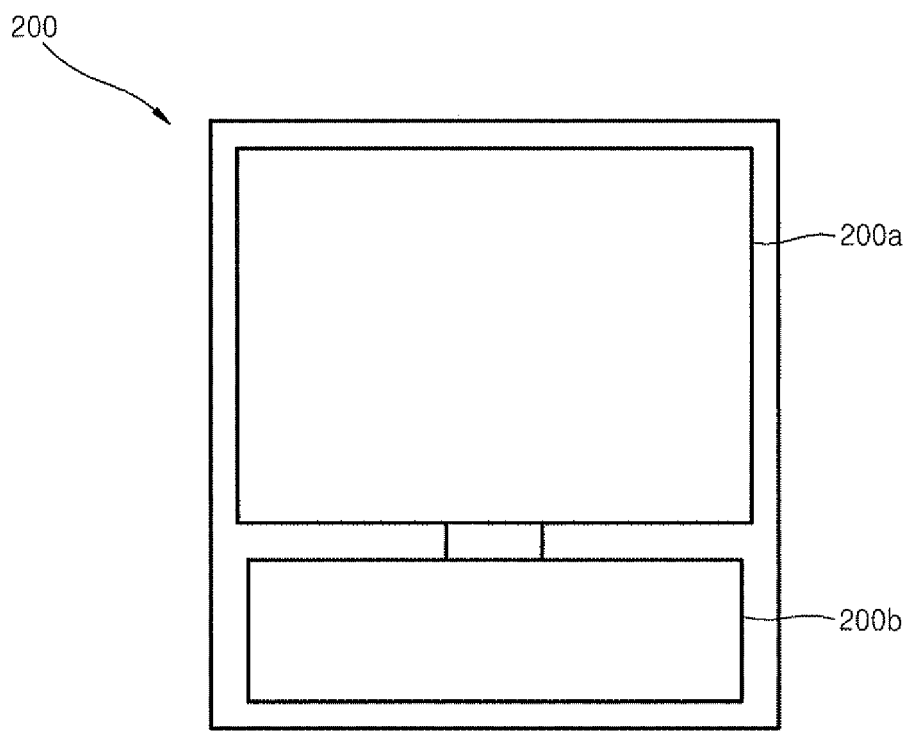
FIG. 14 is a plan view schematically illustrating an electronic apparatus according to an embodiment of the present invention.

FIG. 14 is a plan view schematically illustrating an electronic apparatus 200 according to an embodiment. Referring to FIG. 14, the electronic apparatus 200 includes a body 200A and a power source 200B that supplies power to the body 200A. The electronic apparatus 200 may be a household electronic product or a portable electronic product, for example, a digital home appliance, a portable electronic device, a communication device, or a portable display. The body 200A may further include a battery. Here, a principle of generating electricity or operation of the battery may be different from that of the power source 2006. For example, the battery may be charged with electricity. The power source 200B may be a fuel cell system, for example, the system 100 of FIG. 2, and the power source 200B may be external.

It should be understood that the exemplary embodiments described therein should be considered in a descriptive sense only and not for purposes of limitation of the device. For example, a separate pressure buffering device connected to the pressure regulating chamber 48 may be included, instead of the buffering film 53 and the rubber film 92 included to buffer pressure changes of the pressure regulating chamber 48. In addition, a fuel supply module may be divided into two modules. Moreover, the fuel supply module may be applied when a low concentration fuel cartridge is used. Therefore, while the inventive concept has been particularly shown and described with reference to embodiments thereof, it will be understood that various changes in form and details may be made therein without departing from the spirit and scope of the following claims.

What is claimed is:

1. A fuel cartridge included in a fuel cell system, the fuel cartridge comprising:
    at least two ports, wherein a first port from among the at least two ports is a fuel inlet port and a second port from among the at least two ports is a fuel outlet port;
    a fuel pouch;
    an accommodation space to accommodate the fuel pouch; and
    a storage space spaced apart from the accommodation space, wherein both the fuel pouch and the storage space store fuel, the interior of the storage space is fluidly connected to the interior of the fuel pouch within the fuel cartridge, and the first port and the second port are directly connected to the interior of the storage space and to an exterior of the fuel cartridge.

2. The fuel cartridge of claim 1, further comprising a third port injecting fuel from the outside of the fuel system.

3. The fuel cartridge of claim 1, wherein the fuel pouch is a single-use pouch or a pouch capable of being refilled with fuel.

4. The fuel cartridge of claim 1, further comprising a partition wall interposed between the accommodation space and the storage space, and a connecting member formed on the partition wall to fluidly connect the interior of the fuel pouch accommodated in the accommodation space with the interior of the storage space.

5. The fuel cartridge of claim 1, wherein the first port and the second port are disposed in the same direction.

6. The fuel cartridge of claim 1, wherein the first port is an inlet through which fuel flows into the fuel cartridge from inside of the fuel cell system and an inlet through which the fuel is injected from outside of the fuel cell system.

7. The fuel cartridge of claim 1, wherein the first port is connected to a pressure regulation chamber using a screw fastening method, a fastening method using female and male screws, a compression method, or a connection method using a separate connecting member and the second port is connected to a circulation pump through a screw fastening method, a fastening method using female and male screws, and a compression method, or a connection method using a separate connecting member.

8. The fuel cartridge of claim 1, wherein the first and second ports are disposed in different directions.

9. A fuel supply module of a fuel cell system, the fuel supply module comprising:
    a fuel circulation system that circulates fuel stored in a fuel cartridge along an outer circulating path including the fuel cartridge; and
    a fuel transmission unit that transmits the fuel from the fuel circulation system to outside of the fuel circulation system,
    wherein the fuel cartridge includes:
        at least two ports, wherein a first port from among the at least two ports is a fuel inlet port and a second port from among the at least two ports is a fuel outlet port,
        a fuel pouch,
        an accommodation space to accommodate the fuel pouch, and
        a storage space spaced apart from the accommodation space, wherein both the fuel pouch and the storage space store fuel, the interior of the storage space is fluidly connected to the interior of the fuel pouch within the fuel cartridge, and the first port and the second port are directly connected to the interior of the storage space and to an exterior of the fuel cartridge.

10. The fuel supply module of claim 9, wherein the fuel circulation system comprises:
    a circulation pump that provides power pumping the fuel so that the fuel stored in the fuel cartridge circulates in the outer circulating path;
    a pressure regulating chamber that stores the fuel supplied from the circulation pump, maintains an internal pressure of the pressure regulating chamber to a set pressure, and supplies the fuel to the fuel transmission unit; and
    a pressure regulator that allows the fuel to be transmitted to the fuel cartridge from the pressure regulating chamber, when the internal pressure of the pressure regulating chamber reaches the set pressure.

11. The fuel supply module of claim 9, wherein the fuel transmission unit is a valve.

12. The fuel supply module of claim 10, wherein the internal pressure of the pressure regulating chamber is greater than an external pressure of the fuel transmission unit.

13. The fuel supply module of claim 10, further comprising a buffering unit that decreases a change in the internal pressure of the pressure regulating chamber, while the internal pressure of the pressure regulating chamber reaches the set pressure.

14. The fuel supply module of claim 10, further comprising a manifold to which the fuel circulation system and the fuel transmission unit are fixed, wherein the manifold comprises the pressure regulating chamber, a flow path between elements of the fuel circulation system, and a flow path between the fuel circulation system and the fuel transmission unit.

15. The fuel supply module of claim 10, wherein the pressure regulator comprises a nozzle that generates constant resistance with respect to fuel flowing via the nozzle.

16. The fuel supply module of claim 10, wherein the pressure regulator comprises a relief valve opened above a constant pressure.

17. The fuel supply module of claim 14, wherein the manifold comprises a cover on one side thereof defining a space to accommodate changes of the internal pressure of the pressure regulating chamber and a buffering film interposed between the cover and the one side of the manifold to decrease the change in the internal pressure of the pressure regulating chamber.

18. The fuel supply module of claim 15, wherein the circulation pump is set to supply the fuel to the pressure regulating chamber in a constant amount.

19. The fuel supply module of claim 16, wherein the circulation pump is set to change an amount of the fuel supplied to the pressure regulating chamber within a selected range.

20. The fuel supply module of claim 14, further comprising a pressure sensor measuring the internal pressure of the fuel supply module.

21. The fuel supply module of claim 14, wherein the pressure regulator further comprises a manifold connecting member, an o-ring, and a relief valve fixing member.

22. A fuel cell system comprising:
a fuel cartridge,
a fuel supply module,
a mixer,
a feed pump, and
at least one stack,
wherein the fuel supply module includes a fuel circulation system that circulates fuel stored in a fuel cartridge along an outer circulating path including the fuel cartridge, and a fuel transmission unit that transmits the fuel from the fuel circulation system to outside of the fuel circulation system,
wherein the fuel cartridge includes:
at least two ports, wherein a first port from among the at least two ports is a fuel inlet port and a second port from among the at least two ports is a fuel outlet port,
a fuel pouch,
an accommodation space to accommodate the fuel pouch, and
a storage space spaced apart from the accommodation space, wherein both the fuel pouch and the storage space store fuel, the interior of the storage space is fluidly connected to the interior of the fuel pouch within the fuel cartridge, and the first port and the second port are directly connected to the interior of the storage space and to an exterior of the fuel cartridge.

23. The fuel cell system of claim 22, wherein the at least one stack includes at least one membrane electrode assembly.

24. An electronic apparatus comprising a fuel cell system, wherein the fuel cell system includes a fuel cartridge, a fuel supply module, a mixer, a feed pump, and at least one stack, wherein:
the fuel supply module includes a fuel circulation system that circulates fuel stored in a fuel cartridge along an outer circulating path including the fuel cartridge, and a fuel transmission unit that transmits the fuel from the fuel circulation system to outside of the fuel cell system, and
the fuel cartridge includes:
at least two ports, wherein a first port from among the at least two ports is a fuel inlet port and a second port from among the at least two ports is a fuel outlet port,
a fuel pouch,
an accommodation space to accommodate the fuel pouch, and
a storage space spaced apart from the accommodation space, wherein both the fuel pouch and the storage space store fuel, the interior of the storage space is fluidly connected to the interior of the fuel pouch within the fuel cartridge, and the first port and the second port are directly connected to the interior of the storage space and to an exterior of the fuel cartridge.

25. The electronic apparatus of claim 24, wherein the at least one stack includes at least one membrane electrode assembly.

26. A fuel cell system comprising:
at least one stack; and
a fuel cartridge storing fuel to be supplied to the at least one stack and connected to a pressure regulating chamber interposed between the at least one stack and the fuel cartridge, the pressure regulating chamber including a buffering film, wherein:
the fuel cartridge connects to the pressure regulating chamber through first and second ports located on the fuel cartridge, the first port being a fuel inlet port and the second port being a fuel outlet port, wherein the first port and the second port are directly connected to an exterior of the fuel cartridge, wherein the fuel cartridge further includes a fuel pouch,
wherein the fuel cartridge further includes an accommodation space to accommodate the fuel pouch, and a storage space spaced apart from the accommodation space, wherein both the fuel pouch and the storage space store fuel, the first port and the second port being connected to the storage space, and
wherein the interior of the storage space is fluidly connected to the interior of the fuel pouch within the fuel cartridge, and the first port and the second port are directly connected to the interior of the storage space.

27. The fuel cell system of claim 26, further comprising a circulation pump located between the fuel cartridge and the pressure regulating chamber, wherein the circulation pump receives the fuel stored in the fuel cartridge and supplies the fuel to the pressure regulating chamber.

28. The fuel cell system of claim 27, further comprising a valve interposed between the pressure regulating chamber and a mixer, wherein the mixer dilutes high concentration fuel supplied from the fuel cartridge to low concentration fuel to be supplied to the stack.

29. The fuel cell system of claim 28, further comprising a feed pump interposed between the at least one stack and the mixer, wherein the feed pump supplies the diluted fuel supplied from the mixer to the at least one stack.

30. The fuel cell system of claim 28, wherein the valve, the pressure regulating chamber, and the circulation pump are part of a single unit forming a fuel supply module.

31. The fuel cell system of claim 26, wherein the fuel cartridge is a low concentration fuel cartridge.

32. The fuel cell system of claim 26, wherein the first and second ports are directly connected to the fuel pouch.

* * * * *